A. H. & T. S. Whitacre,
Ditching Machine.
72140
PATENTED
DEC 10 1867
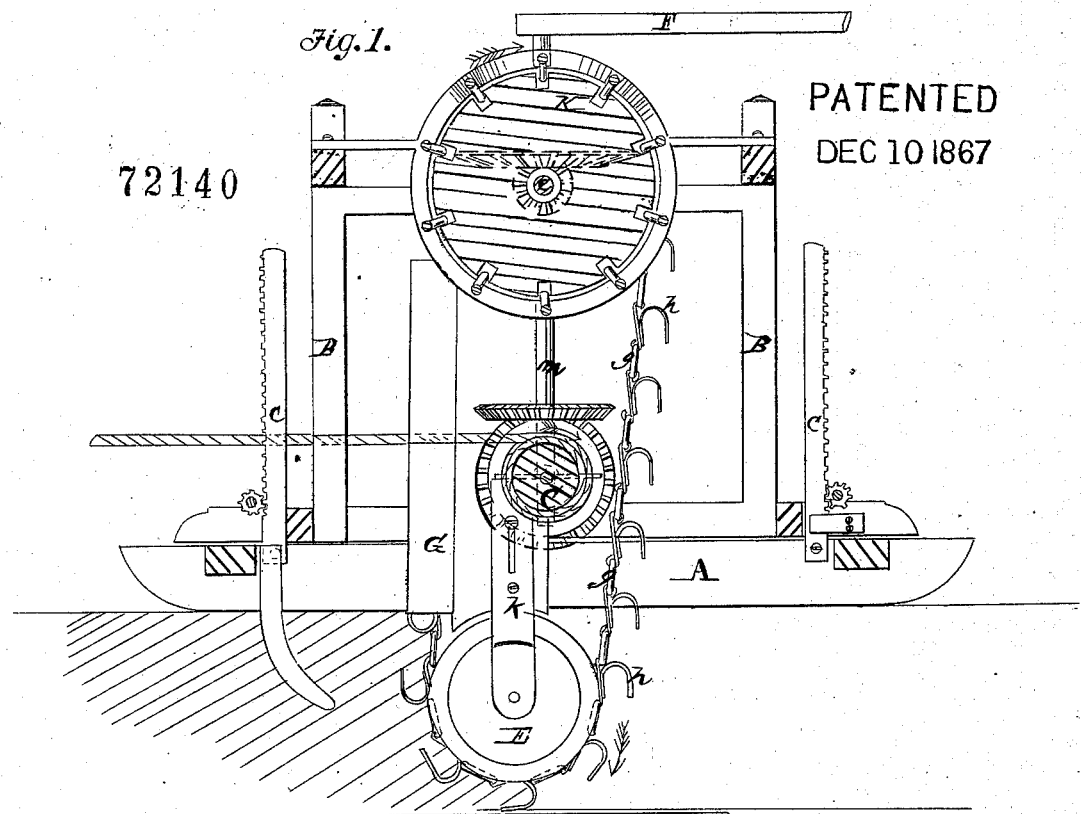
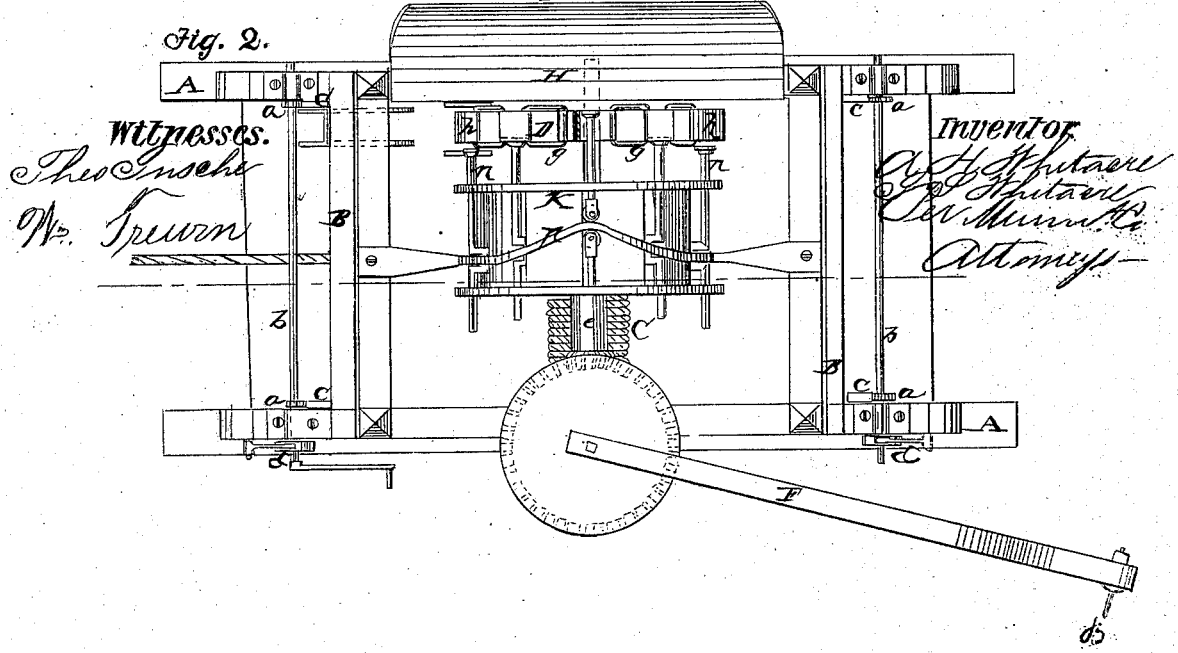
Witnesses.
Theo Tusche
W. Truen
Inventor

United States Patent Office.

A. H. WHITACRE AND T. S. WHITACRE, OF MORROW, OHIO.

Letters Patent No. 72,140, dated December 10, 1867.

---

IMPROVEMENT IN DITCHING-MACHINES.

---

The Schedule referred to in these Letters Patent and making part of the same.

---

TO ALL WHOM IT MAY CONCERN:

Be it known that we, A. H. WHITACRE and T. S. WHITACRE, of Morrow, in the county of Warren, and State of Ohio, have invented a new and improved Ditching-Machine; and we do hereby declare that the following is a full, clear, and exact description thereof, which will enable others skilled in the art to make and use the same, reference being had to the accompanying drawings, forming part of this specification.

Figure 1 is a sectional side elevation through the line $x\ x$, fig. 2, of an improved ditching-machine.

Figure 2 is a top view of the machine.

Similar letters of reference indicate corresponding parts.

This invention relates to a new and useful improvement in the construction of a machine for cutting ditches suitable for laying tile for drainage of land, or pipe of any kind; and consists in a sled which supports a frame carrying the machinery in such manner that the frame can be raised and lowered, to cut the ditch to any required depth. The sled is drawn forward by a rope attached to a stake planted ahead of the machine, which rope winds up on a drum turned by a horse, which travels around the machine, with a sweep that operates at the same time a set of descending and ascending scoops, to cut the ditch, the dirt raised by the scoops being discharged therefrom by a set of plungers, which push it out at the right moment as the scoops come up full of earth. The scoops finish the ditch to the bottom at one operation in passing over the ground.

A represents a sled or pair of runners, that straddle the ditch as it is cut, and B a frame above it. On the four corners are pinions $a\ a$, connected at the front and rear ends of the machine by shafts $b\ b$, to move them simultaneously for raising and lowering upon strong vertical racks $c\ c$ at each corner. Each shaft, $b$, is provided with a ratchet-wheel and dog, $d$, to hold the frame at any height desired to regulate the depth for cutting the ditch. A drum, C, is hung across the frame, which winds a rope, shown in red, that is fastened to a stake in the ground ahead of the machine, to draw it along. Above the drum C a shaft, $e$, is hung transversely, on one end of which, at the side of the machine, is placed a pulley, D, to carry an endless chain, $g$, with scoops or buckets $h\ h$, attached and passing down around a pulley, E, hung in an adjustable side frame, $k$, which allows the endless chain to be regulated and tightened. On the opposite side of the frame A is placed a vertical shaft, $m$, turned by a sweep, F, to which one or more horses will be attached, and this shaft is geared to the shaft of the drum C and the pulley-shaft E, to operate the machine. The scoops $h\ h$ descend and cut the earth in ascending, rising through a guide-box, G, and, as they come above a discharge-apron, H, at the top of the machine and pass over the pulley D, the earth is pushed out of the scoops by plungers $n\ n$, that move back and forth at right angles to the machine's line of motion. The plungers $n\ n$ are set in the periphery of a wheel, K, on the pulley-shaft $e$, and are operated by a stationary double-incline, $p$, that encircles the wheel K and pushes them in and out of the scoops successively as the wheel turns around. The earth is discharged by the apron H outside of the line of the ditch. A pair of cutters, shown in red, is placed in front of the endless chain and scoops to cut the sod the width of the ditch.

Having thus described our invention, what we claim as new, and desire to secure by Letters Patent, is—

1. The combination of the sled A and the frame B, connected by the racks and pinions $c, a$, at the corners, arranged and operating substantially as and for the purpose described.

2. The pulleys D and E, carrying the endless chain $g$ with the scoops $h\ h$, in combination with the drum C, the plungers $n\ n$ operating by the double-incline $p$ around the wheel K and the sweep F, constructed and operating substantially as and for the purpose herein described.

A. H. WHITACRE,
T. S. WHITACRE.

Witnesses:
SAMUEL SMITH,
WM. G. HOPKINS.